US012203635B2

(12) United States Patent
Li et al.

(10) Patent No.: US 12,203,635 B2
(45) Date of Patent: *Jan. 21, 2025

(54) SUPPORT ACCESSORY AND LIGHTING SYSTEM

(71) Applicant: CURRENT LIGHTING SOLUTIONS, LLC, Beachwood, OH (US)

(72) Inventors: Yong Li, ShangHai (CN); Edward John Thomas, Streetsboro, OH (US); Shuyi Qin, ShangHai (CN); Min Fang, ShangHai (CN); Honghao Wu, ShangHai (CN)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,779

(22) Filed: Nov. 14, 2023

(65) Prior Publication Data

US 2024/0085006 A1 Mar. 14, 2024

Related U.S. Application Data

(63) Continuation of application No. 17/261,349, filed as application No. PCT/CN2019/106328 on Sep. 18, 2019, now Pat. No. 11,846,410.

(51) Int. Cl.

*F21V 17/14* (2006.01)
*F21V 17/06* (2006.01)

(Continued)

(52) U.S. Cl.

CPC .............. *F21V 21/14* (2013.01); *F21V 17/06* (2013.01); *F21Y 2115/10* (2016.08)

(58) Field of Classification Search

CPC ........ F21V 21/14; F21V 17/06; F21V 19/007; F21V 21/10; F21Y 2115/10; F21K 9/232; F21S 8/08

See application file for complete search history.

(56) References Cited

U.S. PATENT DOCUMENTS 2,963,255 A 12/1960 Bobrick
4,727,460 A 2/1988 Payne (Continued)

FOREIGN PATENT DOCUMENTS

CN 203162868 U 8/2013
CN 103672672 A 3/2014

(Continued)

OTHER PUBLICATIONS

Information Disclosure Statement dated Jan. 19, 2021 which was file in connection with U.S. Appl. No. 17/261,349.

(Continued)

*Primary Examiner* — Robert J May

(74) *Attorney, Agent, or Firm* — Buckley, Maschoff & Talwalkar LLC

(57) ABSTRACT

Support assemblies for supporting a light-emitting diode (LED) lamp, which may be a heavy LED lamp. In an embodiment, a support assembly includes a frame having a ring and configured to be detachably connected to a front cover of an LED lamp. The support assembly also includes a plurality of position modules uniformly distributed around the periphery of the ring, wherein the position modules may cover at least a portion of the front cover of the LED lamp, and at least one support leg attached to the frame. The at least one support leg supports the frame and an inserted LED lamp on at least one support surface, and at least one support (Continued)

leg is slidably coupled to the frame and adjustable to provide a support length between the frame and the at least one support surface.

17 Claims, 10 Drawing Sheets

(51) Int. Cl.
*F21V 21/14* (2006.01)
*F21Y 115/10* (2016.01)

(56) References Cited

U.S. PATENT DOCUMENTS

| | | | | |
|---|---|---|---|---|
| 5,398,177 | A * | 3/1995 | Harwood | F21V 21/34 362/396 |
| 2015/0300612 | A1 | 10/2015 | Stathes et al. | |
| 2018/0224095 | A1 | 8/2018 | Cohen | |

FOREIGN PATENT DOCUMENTS

| | | | |
|---|---|---|---|
| CN | 106931410 | A | 7/2017 |
| CN | 107035993 | | 8/2017 |
| CN | 206390623 | U | 8/2017 |
| CN | 107238061 | A | 10/2017 |
| CN | 206555764 | U | 10/2017 |
| CN | 107477464 | A | 12/2017 |
| CN | 206771280 | U | 12/2017 |
| CN | 207005926 | U | 2/2018 |
| CN | 107883352 | A | 4/2018 |
| CN | 207621811 | U | 7/2018 |
| EP | 3604914 | A1 | 2/2020 |

OTHER PUBLICATIONS

International Search Report and Written Opinion dated Dec. 10, 2020 which was issued in connection with PCT/CN2019/106328 which was filed on Sep. 18, 2019 (Written Opinion in Chinese only).
Information Disclosure Statement dated May 20, 2021 which was file in connection with U.S. Appl. No. 17/261,349.
Office Action dated Mar. 19, 2021 which was issued in connection with Chinese Application No. 201810802530.6, which was filed on Jul. 20, 2018.
892 Form dated Feb. 24, 2023 which was received in connection with U.S. Appl. No. 17/261,349.
Notice of Allowance dated Aug. 3, 2023 which was received in connection with U.S. Appl. No. 17/261,349.

* cited by examiner

SUPPORT ACCESSORY AND LIGHTING SYSTEM

CROSS-REFERENCE TO RELATED APPLICATION

This application is a continuation application of U.S. application Ser. No. 17/261,349 filed on Aug. 18, 2021, which is a U.S. National Stage filing under 35 U.S.C. § 119, based on and claiming the benefits of and priority to PCT/CN201/106328 filed on Sep. 18, 2019. The entire disclosures of the above patent applications are incorporated herein by reference for all purposes.

BACKGROUND

Embodiments of the present disclosure relate generally to a support assembly, and more particularly relate to a support assembly for use in the lighting field.

Traditionally, high intensity discharge (HID) lighting sources are used for a wide array of lighting applications in public spaces such as stores, libraries, theatres and school gymnasiums, for example. The move towards improved energy efficiency has brought a forefront light emitting diode (LED) technology as an alternative to HID lighting in commercial and municipal applications. LED lighting has the potential to provide improved energy efficiency and improved light output in various applications.

LED lighting sources which are designed to replace the HID lighting sources, especially the high wattage lighting sources, usually have big sizes and weights. When the LED lighting source is installed horizontally or angularly in a lighting fixture, the large and heavy LED lighting source will bring a high torque force to a screw base for connecting the LED lighting source to the lighting fixture. In current approaches, some supporting elements are fixed on the LED lighting sources to support the LED lighting sources. However, since the LED lighting sources may be installed in different kinds of lighting fixtures, different supporting elements may be required to fit different lighting fixtures, which may lead to a big inventory pressure and a relatively laborious operation.

Therefore, it is desirable to provide a support assembly to address one or more of the above-mentioned situations.

BRIEF DESCRIPTION

In accordance with one embodiment disclosed herein, a support accessory is provided for an LED lamp, the support accessory includes a frame and a supporting leg. The frame is configured to be detachably coupled to the LED lamp, and the supporting leg is configured for supporting the frame on at least one certain support surface when the LED lamp is installed. Wherein, in a first state, the supporting leg is fixed to the frame, and in a second state, the supporting leg is slidably coupled to the frame and is slidable relative to the frame to adjust a support length of the supporting leg between the frame and the at least one certain support surface.

In accordance with another embodiment disclosed herein, a lighting system includes a cover, a transparent or translucent lens, an LED lamp and a support accessory. The LED lamp is coupled to the cover and accommodated in an inner cavity defined by the cover and the lens. The support accessory is coupled to the cover and accommodated in an inner cavity defined by the cover and the lens, and the support accessory includes a frame and a supporting leg. The frame is configured to be detachably coupled to the LED lamp, and the supporting leg is configured for supporting the frame on at least one certain support surface when the LED lamp is installed. Wherein, in a first state, the supporting leg is fixed to the frame, and in a second state, the supporting leg is slidably coupled to the frame and is slidable relative to the frame to adjust a support length of the supporting leg between the frame and the at least one certain support surface.

BRIEF DESCRIPTION OF THE DRAWINGS

The accompanying drawings, which are incorporated herein and form part of the specification, illustrate the present disclosure and, together with the description, further serves to explain the principles of the disclosure and to enable a person skilled in the relevant art(s) to make and use the disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer.

Figure 1:
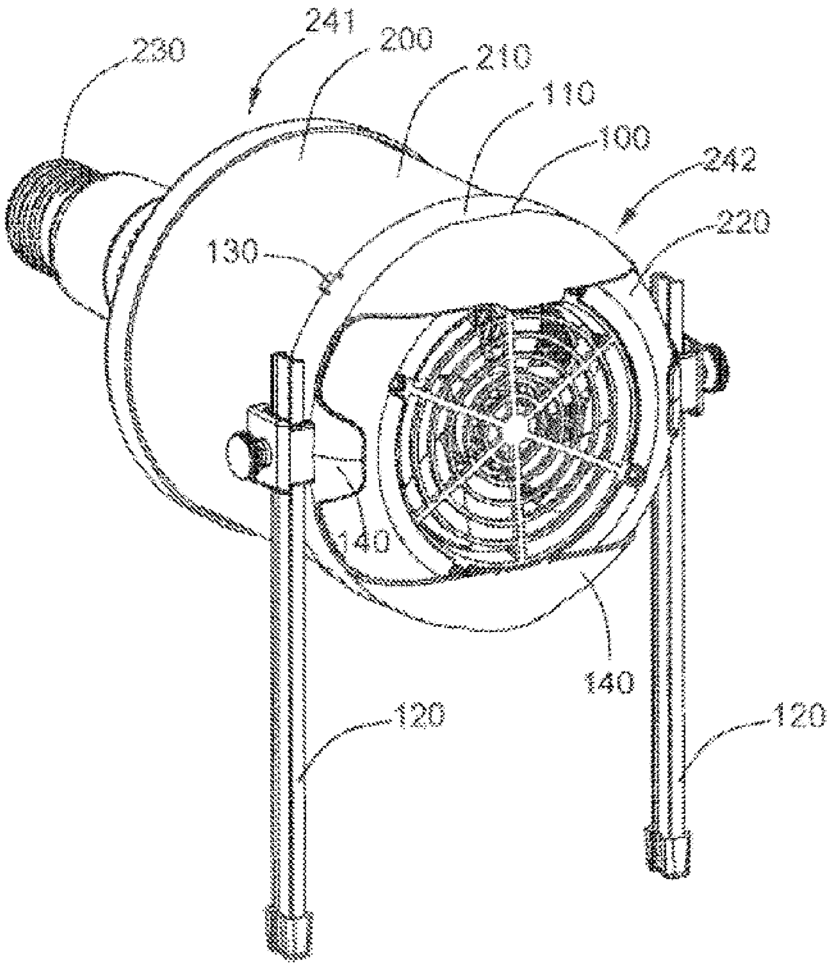
FIG. 1 is a perspective view of an exemplary support accessory in connecting with a LED lamp, in accordance with aspects described herein.
Figure 2:
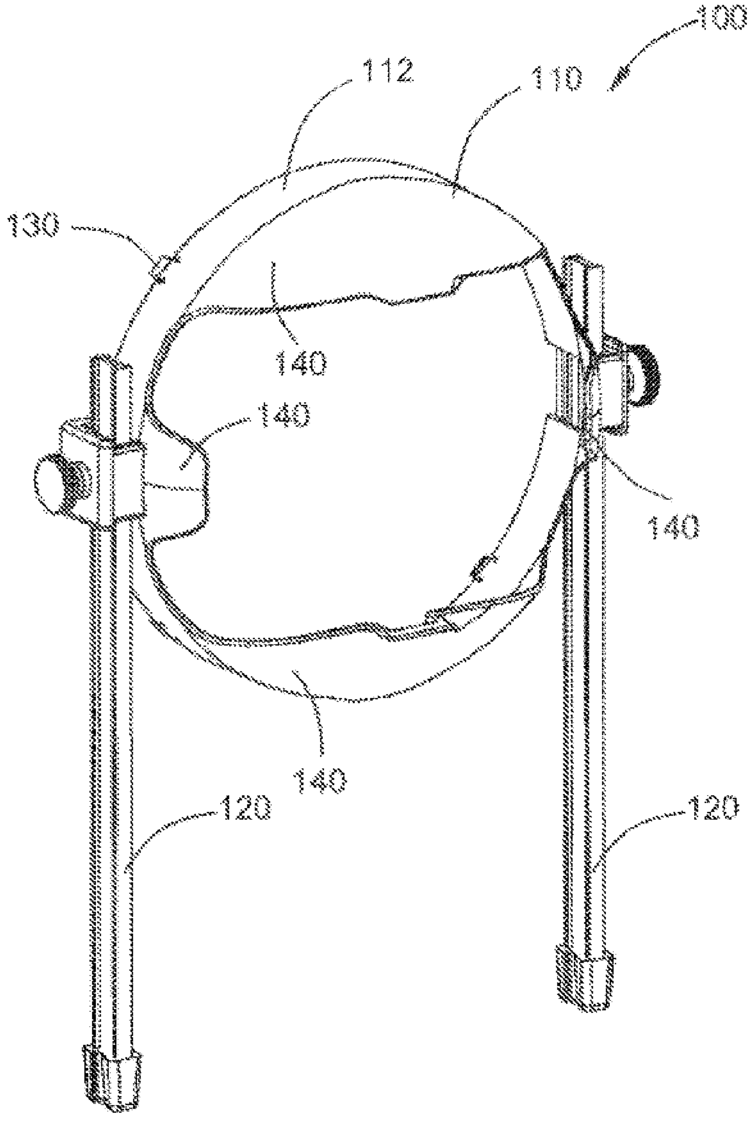
FIG. 2 is a perspective view of the support accessory of FIG. 1 in accordance with aspects described herein.
Figure 3:
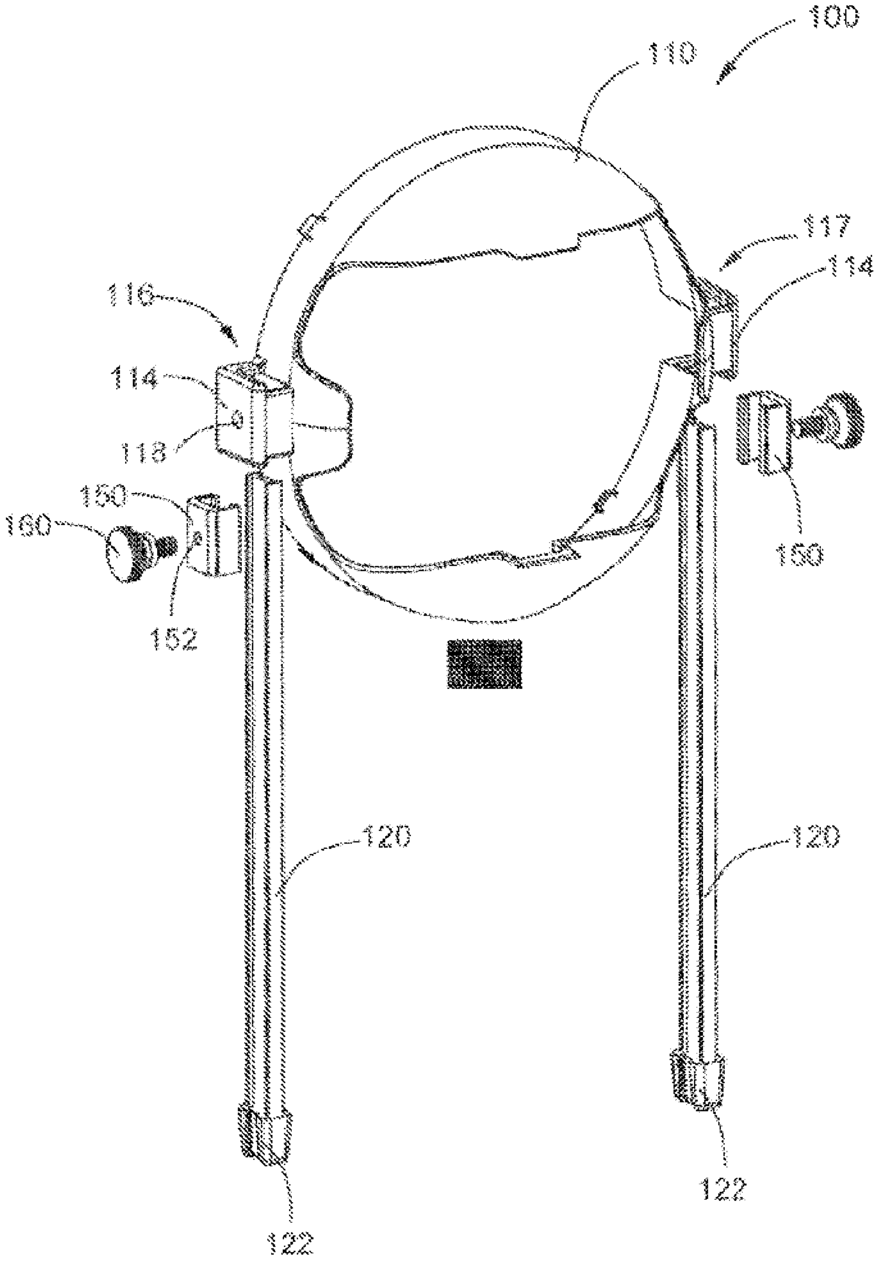
FIG. 3 is an exploded view of the support accessory of FIG. 1 in accordance with aspects described herein.

FIG. 1 is a perspective view of a connector assembly 100 in connecting with a LED lamp 200. FIG. 2 is a perspective view of the support accessory 100 of FIG. 1. FIG. 3 is an exploded view of the support accessory 100 of FIG. 1. The supporting accessory 100 includes a frame 110 and two supporting legs 120. The frame 110 is detachably coupled to the LED lamp 200, and the two supporting legs 120 are configured for supporting the frame 110 and the LED lamp 200 on at least one certain support surface (such as an inner surface 705 shown in FIG. 7) when the LED lamp 200 is installed. In a first state, the supporting leg 120 is fixed to the frame 110, and in a second state, the supporting leg 120 is slidably coupled to the frame 110 and is slidable relative to the frame 110 to adjust a support length of the supporting leg 120 between the frame 110 and the at least one certain support surface. The support length is a distance between the certain support surface and a junction of the supporting leg 120 and the frame 100.

A type and structure of the LED lamp are not limited herein. In some embodiments, the LED lamp 200 includes a main housing 210, a base 230 and a front cover 220. The main housing 210 has opposite ends 241 and 242, with the end 241 coupled to the base 230 and the end 242 as a free end. The front cover 220 is coupled to the free end 242 of the LED lamp 200.

In some embodiments, the frame 110 is detachably coupled to the front cover 220 of the LED lamp 200 via at least one clip 130 and at least one position module 140. Referring to FIG. 1 and FIG. 2, the frame 110 has a circular ring 112, and the at least one position module 140 extending from the circular ring 112 is configured to cover at least part of the front cover 220. The at least one clip 130 is approximately uniformly distributed around a periphery of the circular ring 112 and configured to clamp the LED lamp 200. In this embodiment, four clips 130 which are integrally formed with the circular ring 112 are configured to clamp the front cover 220 of the LED lamp 200. Four position modules 140 are approximately uniformly distributed around the periphery of the circular ring 112, and the position modules 140 are integrally formed with the frame 110. The position modules may be different in size and shape. In some other embodiments, the frame 110 may be integrally formed with the LED lamp 200, or the front cover of the LED lamp 200 may be deemed as the frame and the frame is detachably coupled to the free end 242 of the LED lamp 200.

In some embodiments, the frame 110 with at least one clip 130 and at least one position module 140 is/are made of a plastic material, and it can be detachably coupled to the LED lamp 200 quickly and easily without impacting the light output.

FIG. 3 is an exploded view of the support accessory 100 of FIG. 1. The frame 110 further includes at least one protrusion 114, and each protrusion 114 defines a cavity 116. The supporting leg 120 is partially accommodated in the cavity 116, in a manner that the supporting leg 120 passes through the cavity 116 when the supporting leg 120 slides relative to the frame 110. In some embodiments, the support accessory 100 further includes a sliding guide 150 at least partially accommodated in the cavity 116, and the supporting leg 120 is partially accommodated in the sliding guide 150 and slidable along the sliding guide 150 in the second state.

In some embodiments, the supporting leg 120 and the sliding guide 150 are made of lightweight metal materials, such as Aluminum, which may be formed via an extrusion process. And the supporting leg 120 may include a rubber cushion 122 at an end thereof, for contacting the at least one certain support surface (shown in FIG. 7) and for avoiding damage to the certain support surface.

In some embodiments, the support accessory 100 further includes a fastener 160 used to affix the supporting leg 120 relative to the frame 110 in the first state, and to detach the supporting leg 120 from the frame 110 in the second state. In the first state, the fastener 160 extends into the cavity 116 through a first hole 118 of the frame 110 and a second hole 152 of the sliding guide 150 and when tightened presses the supporting leg 120 to the frame 110. And in the second state, when untightened the fastener 150 releases the supporting leg 120, such that the supporting leg 120 can slide relative to the frame 110 to adjust the support length.

In some embodiments, as shown in FIG. 3, the frame 110 includes two protrusions 114 defining a first cavity 116 and a second cavity 117, respectively. The first cavity 116 and the second cavity 117 are distributed on lateral sides of the frame 110, respectively. The two separate supporting legs 120 pass through the first cavity 116 and the second cavity 117, respectively, when the supporting legs 120 slide relative to the frame 110. In some embodiments, the two supporting legs 120 are approximately parallel to each other. And in some other embodiments, by adjusting the structure of the protrusions 114 the two supporting legs 120 may form an angle therebetween.

Figure 4:
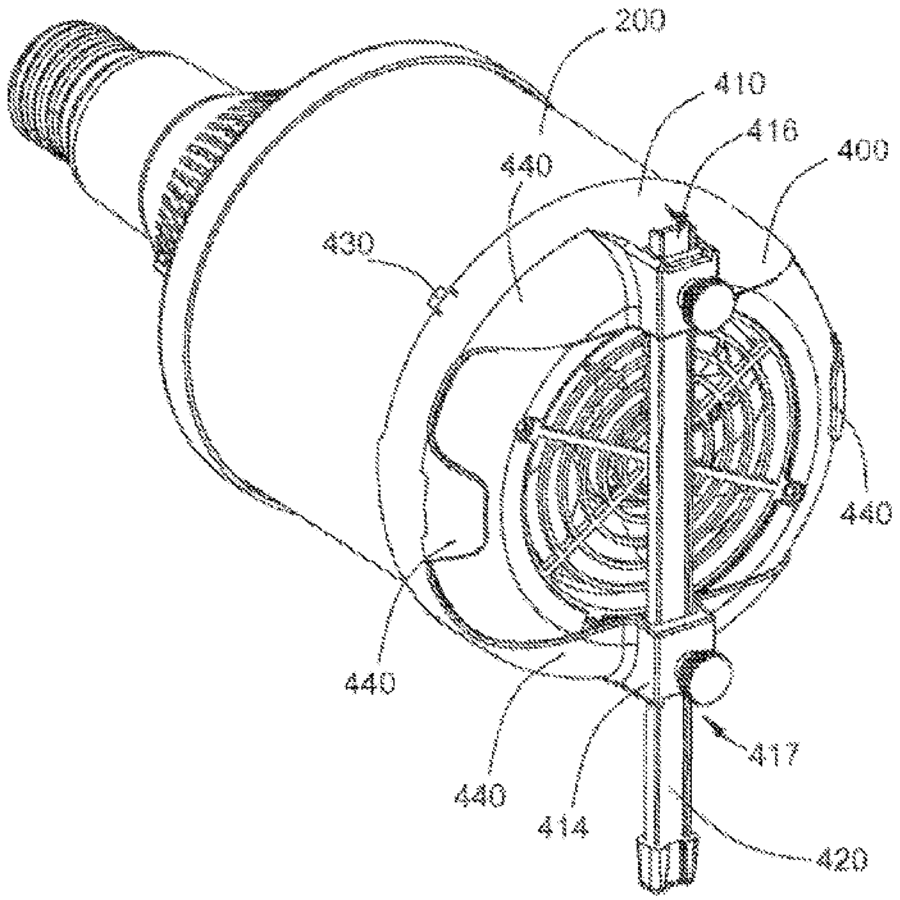
FIG. 4 is a perspective view of another exemplary support accessory in connecting with the LED lamp, in accordance with aspects described herein.

FIG. 4 is a perspective view of another exemplary support accessory 400 in connection with the LED lamp 200. The support accessory 400 includes a frame 410 which is similar to the frame 110 of FIG. 1. A difference between the frame 410 and the frame 110 is that the frame 410 includes two protrusions 414 defining a first cavity 416 and a second cavity 417, respectively, such that the first cavity 416 and the second cavity 417 are aligned with each other so that a support leg 420 is able to pass through both the first cavity 416 and the second cavity 417 when the supporting leg 420 slides relative to the frame 410. In some embodiments, the two protrusions 414 are mounted on two position modules 440 that are symmetrical with respect to an axis of the LED lamp 200.

Figure 5:
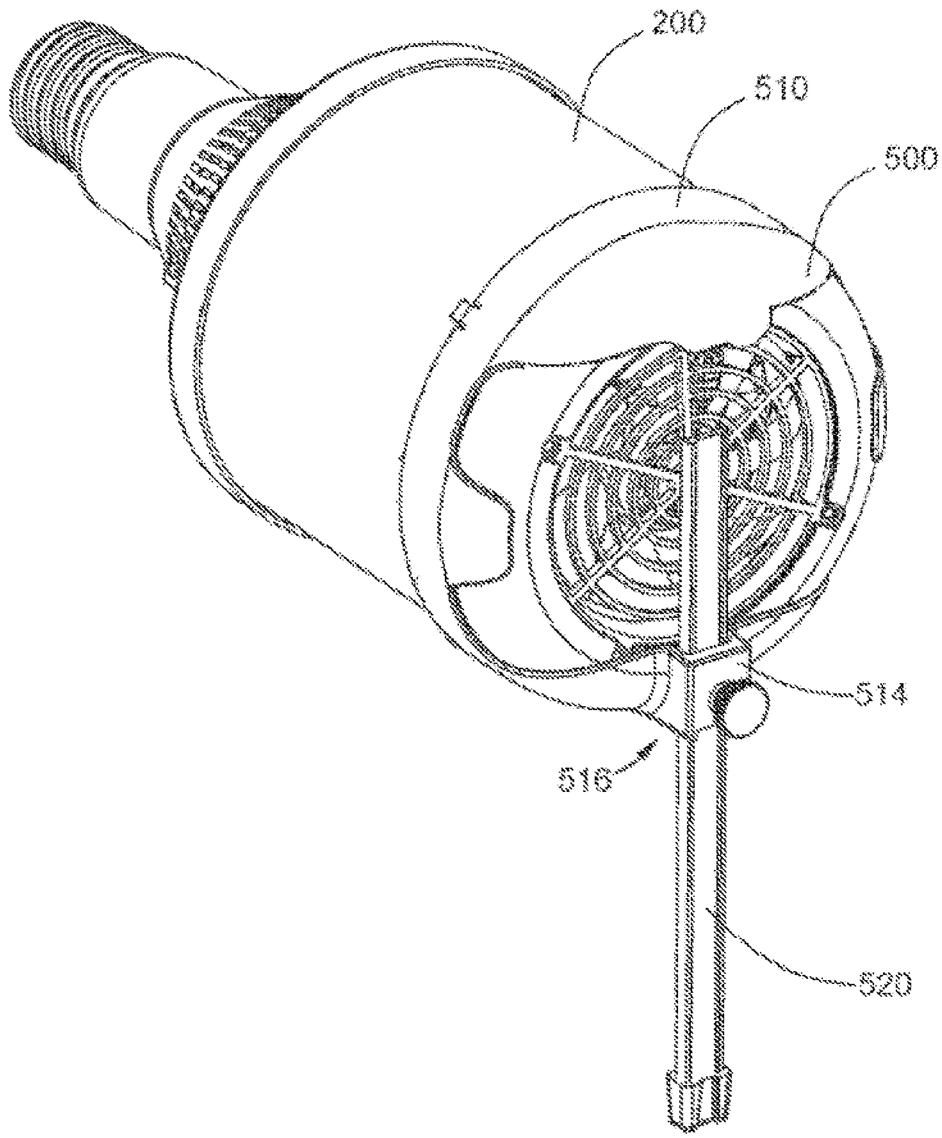
FIG. 5 is a perspective view of a yet another exemplary support accessory in connecting with the LED lamp, in accordance with aspects described herein.

FIG. 5 is a perspective view of a yet another exemplary support accessory 500 in connecting with the LED lamp 200. The support accessory 500 includes a frame 510 which is similar to the frame 410 of FIG. 4. A difference between the frame 510 and the frame 410 is that the frame 510 includes one protrusion 514 defining a first cavity 516, and a support leg 520 passes through the first cavity 516 when the supporting leg 520 slides relative to the frame 510.

Figure 6:
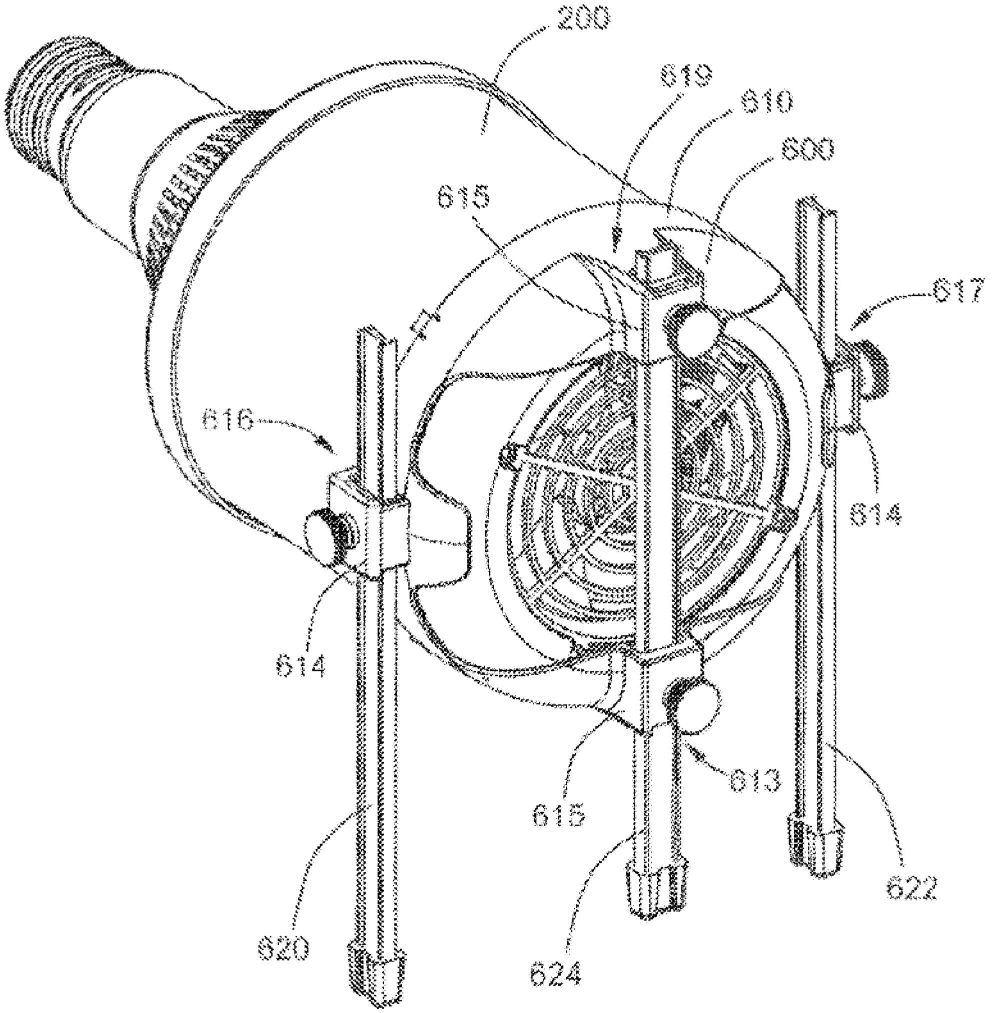
FIG. 6 is a perspective view of a yet another exemplary support accessory in connecting with the LED lamp, in accordance with aspects described herein.

FIG. 6 is a perspective view of a yet another exemplary support accessory 600 in connecting with the LED lamp 200. The support accessory 600 includes a frame 610 that includes two first protrusions 614 and two second protrusions 615. The two first protrusions 614 define a first cavity 616 and a second cavity 617 distributed on lateral sides of the frame 610, respectively. A supporting leg 620 passes through the first cavity 616 when the supporting leg 620 slides relative to the frame 610, and the support accessory 600 further includes an additional supporting leg 622 that passes through the second cavity 617 when the additional supporting leg 622 slides relative to the frame 610. The two second protrusions 614 define a third cavity 619 and a fourth cavity 613, respectively. The third cavity 619 and fourth cavity 613 are aligned with each other such that a support leg

624 is able to pass through both the third cavity 619 and the fourth cavity 613 when the supporting leg 624 slides relative to the frame 610.

Figure 7:
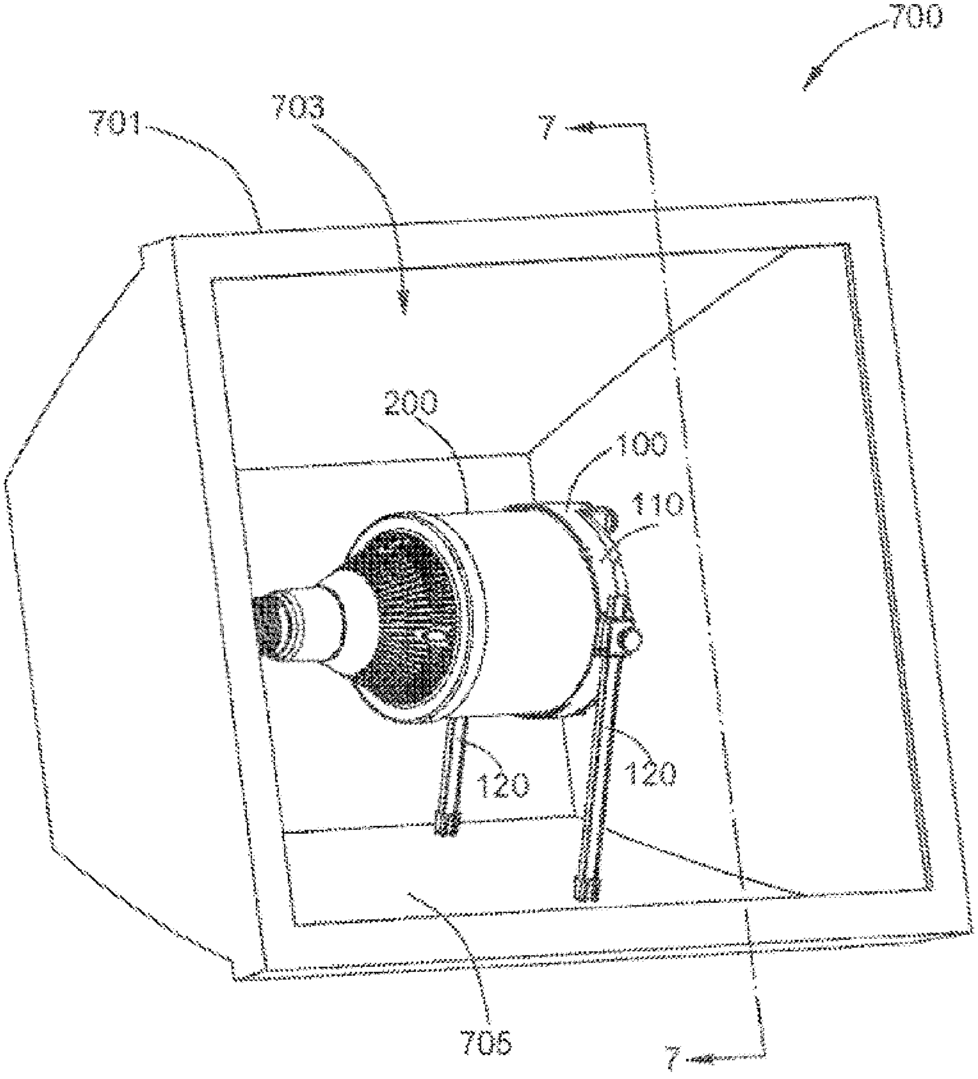
FIG. 7 is a perspective view of an exemplary lighting system in accordance with aspects described herein.
Figure 8:
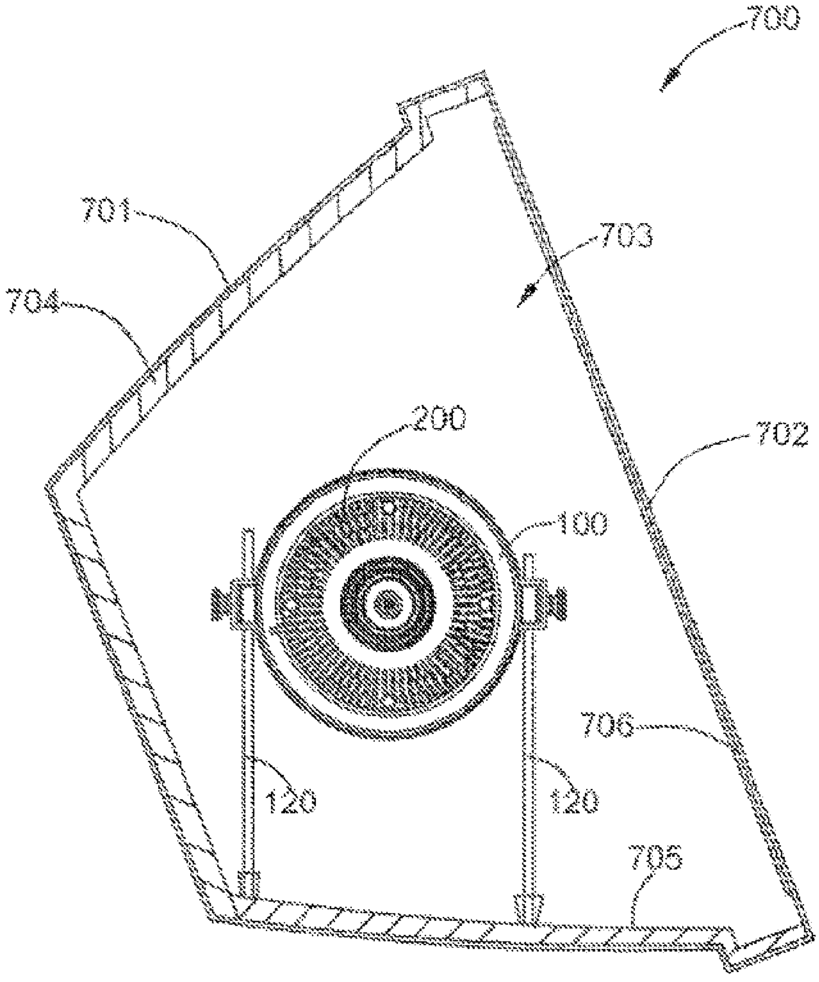
FIG. 8 is a cross-section view taken along the line 7-7 of FIG. 7.

FIG. 7 is a perspective view of an exemplary lighting system 700. FIG. 8 is a cross-section view taken along dotted line 7-7 of FIG. 7. The lighting system 700 includes a cover 701 (also called a lighting fixture), a transparent or translucent lens 702, the LED lamp 200 and the supporting accessory 100 (such as that shown in FIG. 1). Referring to FIGS. 1 and 7, the base 230 of the LED lamp 200 is coupled to the cover 701 and accommodated in an inner cavity 703 defined by the cover 701 and the lens 702. When the LED lamp 200 is installed horizontally or angularly in the cover 701, the heavy LED lamp (for example, a 1.0 kg to 2.0 kg LED lamp) exerts a high torque force to the base 230 of the LED lamp 200. The support accessory 100 is coupled to the free end 242 of the LED lamp 200 and configured to support the LED lamp 200. In some embodiments, the lighting system 700 further includes a reflector 704 configured to direct light from the LED lamp 200.

In some embodiments, as shown in FIG. 3, FIG. 7 and FIG. 8, before the LED lamp 200 is installed into the cover 701, the frame 110 is detachably coupled to the LED lamp 200. In the second state, the supporting legs 120 pass through the first cavity 116 and the second cavity 117, respectively, and each supporting leg 120 is partially accommodated in the sliding guide 150 of the cavity. When the LED lamp 200 is installed in the cover 701, the both of the supporting legs 120 slide relative to the frame 110 to adjust the support lengths of both of the supporting legs 120 between the frame 110 and the at least one certain support surface (for example, inner surface 705 in FIG. 7). In the first state, immediately after the supporting legs 120 contact the at least one certain support surface (to support the frame 110 and the LED lamp 200), the supporting legs 120 are then affixed to the frame 110, for example, via the fastener 160. The certain support surface may be a surface of a component or device surrounding the LED lamp 200 and the support accessory. For example, the certain support surface may be any inner surface 705 of the cover 701 or an inner surface 706 of the lens 702. As the inner surface 705 of the cover 701 may not be a flat surface or the LED lamp 200 may be installed at an angle to the cover 701, the supporting lengths of the two supporting legs may be different. The support accessory 100 having an adjustable supporting length may be flexible enough to adapt itself to different lighting systems for different applications.

Figure 9:
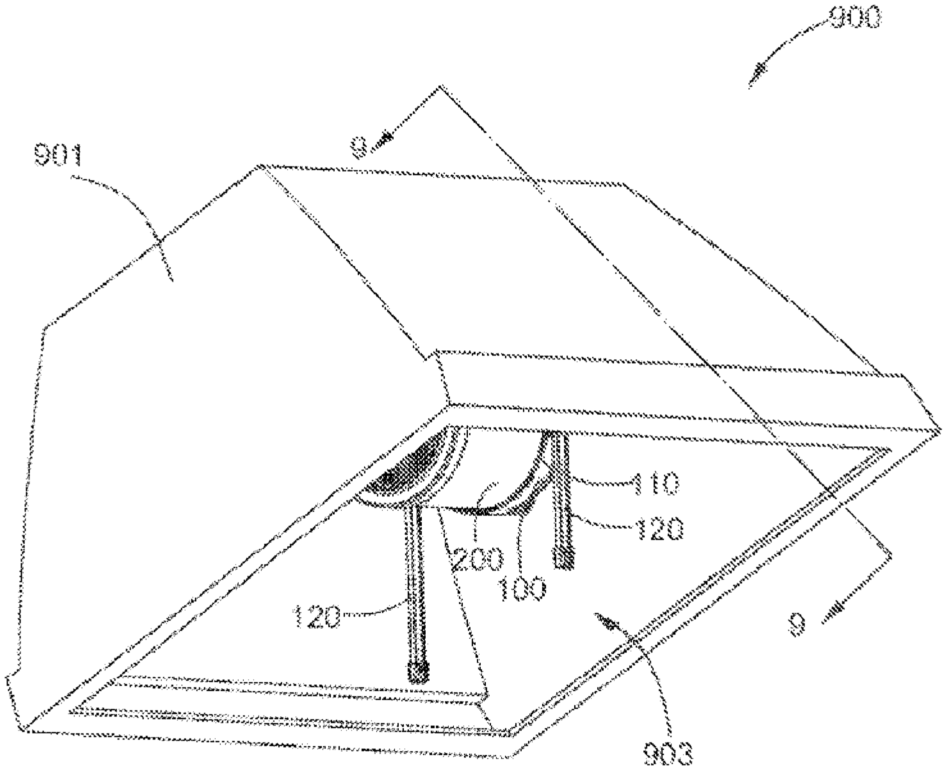
FIG. 9 is a perspective view of another exemplary lighting system in accordance with aspects described herein.
Figure 10:
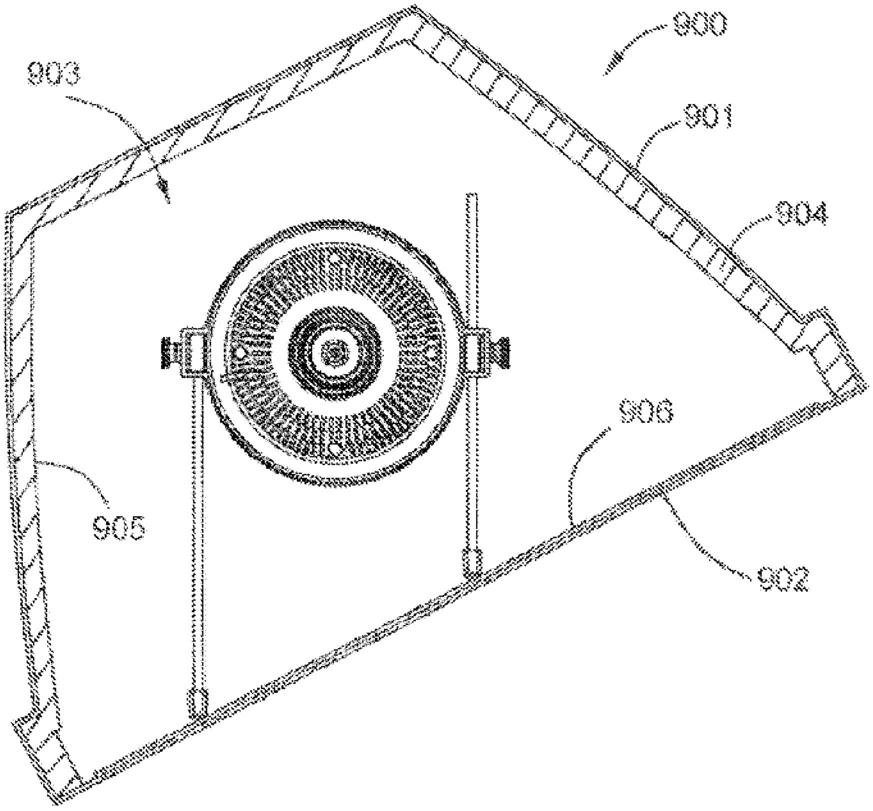
FIG. 10 is a cross-section view taken along the line 9-9 of FIG. 9.

FIG. 9 is a perspective view of another exemplary lighting system 900, and FIG. 10 is a cross-sectional view taken along the dotted line 9-9 of FIG. 9. The lighting system 900 includes a cover 901, a transparent or translucent lens 902, a reflector 904, the LED lamp 200 and the supporting accessory 100 (as shown in FIG. 1). Referring to FIGS. 1 and 9, the base 230 of the LED lamp 200 is coupled to the cover 901 and accommodated in an inner cavity 903 defined by the cover 901 and the lens 902. When the LED lamp 200 is installed in the cover 901, the supporting legs 120 slide relative to the frame 110 to adjust the support lengths of the two supporting legs 120 between the frame 110 and the at least one certain support surface. In the first state, immediately after the supporting legs 120 contact the at least one certain support surface (to support the frame 110 and the LED lamp 200), the supporting legs 120 are affixed to the frame 110, for example, via tightening of the fastener 160. As shown in FIG. 10, the certain support surface may be an inner surface 906 of the lens 902. In some other embodiments, the supporting legs 120 may be supported, for example, by both an inner surface 905 of the reflector 904 and the inner surface 906 of the lens 902.

In some embodiments, the supporting accessory shown in FIGS. 4-6 may also be installed quickly and adjusted easily in the aforementioned lighting system.

The support accessory of this disclosure is designed to include the frame with clips and position modules and can be quickly and easily attached to the LED lamp. Metal supporting legs made via an extrusion process are strong enough to support the LED lamps, and the supporting legs with adjustable supporting lengths may help the supporting accessory adapt itself to all kinds of lighting systems.

The extent of patent protection for this application is defined by the claims, and the patent protection may also cover other embodiments that could be thought of by those skilled in the art. In addition, many modifications may be made to what has been disclosed herein to adapt a particular configuration or material to the teachings of the disclosure without departing from the spirit and scope thereof. Therefore, it is intended that the disclosure not be limited to the particular embodiments disclosed herein, but that the disclosure includes all embodiments falling within the scope of the appended claims.

Furthermore, those skilled in the art will recognize the interchangeability of various features from the different embodiments disclosed herein. The various features described, as well as other known equivalents for each feature, can be mixed and matched by one of ordinary skill in this art to construct additional systems and techniques in accordance with principles of this disclosure.

What is claimed is:

1. A support assembly for a light-emitting diode (LED) lamp, comprising:
- a frame comprising a ring and configured to be detachably connected to a front cover of the LED lamp;
- a plurality of position modules uniformly distributed around the periphery of the ring, the position modules configured to cover at least a portion of the front cover of the LED lamp; and
- at least one support leg attached to the frame and configured to support the frame and the inserted LED lamp on at least one support surface, wherein the at least one support leg is slidably coupled to the frame and adjustable to provide a support length between the frame and the at least one support surface.

2. The support assembly of claim 1, further comprising at least one protrusion affixed to the frame and defining a cavity for partially accommodating the at least one support leg.

3. The support assembly of claim 2, further comprising a sliding guide at least partially accommodated in the cavity, wherein the sliding guide comprises a through hole and wherein the at least one support leg is slidably adjustable along the sliding guide.

4. The support assembly of claim 3, further comprising a fastener configured to extend into the cavity through a first hole in the protrusion and the through hole of the sliding guide to contact the at least one support leg, wherein when the fastener is tightened it affixes the at least one support leg at a desired support length.

5. The support assembly of claim 2, further comprising a fastener configured to extend into the cavity through a first hole in the protrusion and to contact the at least one support leg, wherein when the fastener is tightened it affixes the at least one support leg at a desired support length.

6. The support assembly of claim 2, wherein the at least one protrusion comprises a first protrusion and a second protrusion connected to lateral sides of the frame, and wherein the first protrusion defines a cavity for partially accommodating a first support leg and the second protrusion defines a cavity for partially accommodating a second support leg.

7. The support assembly of claim 6, wherein the first protrusion and the second protrusion are connected to the frame in such manner that the first support leg and the second support leg are approximately parallel to each other when affixed thereto.

8. The support assembly of claim 1, further comprising at least one clip for detachably coupling the front cover of the LED lamp to the at least one position module.

9. The support assembly of claim 1, further comprising a rubber cushion affixed to an end of the at least one support leg.

10. A lighting system, comprising a cover comprising an inner cavity and having an inner surface;

a lens connected to the cover and comprising an inner surface;

an LED lamp comprising a front cover; and and the through hole of the sliding guide to contact the at least one support leg, wherein when the fastener is tightened it affixes the at least one support leg at a desired support length.

11. The lighting system of claim 10, wherein the support assembly further comprises at least one protrusion affixed to the frame and defines a cavity for partially accommodating the at least one support leg.

12. The lighting system of claim 11, wherein the support assembly further comprises a sliding guide at least partially accommodated in the cavity, wherein the sliding guide comprises a through hole and wherein the at least one support leg is slidably adjustable along the sliding guide.

13. The lighting system of claim 12, wherein the support assembly further comprises a fastener configured to extend into the cavity through a first hole in the protrusion and the through hole of the sliding guide to contact the at least one support leg, wherein when the fastener is tightened it affixes the at least one support leg at a desired support length.

14. The lighting system of claim 11, wherein the support assembly further comprising a fastener configured to extend into the cavity through a first hole in the protrusion and to contact the at least one support leg, wherein when the fastener is tightened it affixes the at least one support leg at a desired support length.

15. The lighting system of claim 11, wherein the at least one protrusion of the support assembly comprises a first protrusion and a second protrusion connected to lateral sides of the frame, and wherein the first protrusion defines a cavity for partially accommodating a first support leg and the second protrusion defines a cavity for partially accommodating a second support leg.

16. The lighting system of claim 10, wherein the support assembly further comprises at least one clip for detachably coupling the front cover of the LED lamp to the at least one position module.

17. The lighting system of claim 10, wherein the at least one support leg of the support assembly comprises a rubber cushion on a distal end for contacting the at least one inner surface of the cover, a support assembly for the LED lamp, wherein the support assembly comprises:

a frame comprising a ring and configured to be detachably connected to the front cover of the LED lamp;

a plurality of position modules uniformly distributed around the periphery of the ring, the position modules configured to cover at least a portion of the front cover of the LED lamp; and at least one support leg attached to the frame and configured to support the frame and the inserted LED lamp on at least one of a portion of the inner surface of the cover and the inner surface of the lens within the inner cavity, wherein the at least one support leg is slidably coupled to the frame and adjustable to provide a support length between the frame and the at least one inner surface of the cover.

* * * * *